(12) United States Patent
Bohn (10) Patent No.: US 6,300,645 B1
(45) Date of Patent: Oct. 9, 2001

(54) POSITION SENSING DEVICE HAVING A SINGLE PHOTOSENSING ELEMENT

(75) Inventor: David D. Bohn, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/382,939

(22) Filed: Aug. 25, 1999

(51) Int. Cl.⁷ .................................................. G01N 21/86
(52) U.S. Cl. .................... 250/559.38; 250/234; 250/216; 250/566
(58) Field of Search ............................... 250/566, 559.38, 250/208.1, 216, 234, 221; 235/472.01, 472.02, 462.45; 382/311–316; 358/478, 488

(56) References Cited

U.S. PATENT DOCUMENTS

| | | | |
|---|---|---|---|
| 5,278,937 | * 1/1994 | Barkan et al. | 235/462 |
| 5,552,597 | 9/1996 | McConica | 250/234 |
| 5,578,813 | 11/1996 | Allen et al. | 250/208.1 |
| 5,644,139 | 7/1997 | Allen et al. | 250/557 |
| 5,646,394 | 7/1997 | Steinle et al. | 250/208.1 |
| 5,646,402 | 7/1997 | Khovaylo et al. | 250/234 |
| 5,723,859 | 3/1998 | Kerschner et al. | 250/234 |
| 6,043,503 | * 3/2000 | Dow et al. | 250/566 |

* cited by examiner

*Primary Examiner*—Que T. Le (57) ABSTRACT

A position sensing device having a single photosensing element is disclosed herein. The position sensing device determines the location of an object to which the position sensing device is attached relative to a surface. The position sensing device has a plurality of light paths that direct light from different area portions of the surface to the single photosensing element. Each area portion of the surface is associated with a light source wherein each light source may be activated individually. A processor illuminates these area portions individually. As the area portions are illuminated, the photosensing element creates image data representative of the image of the area portion being illuminated. The processor analyzes the image data and identifies distinct features in the area portions. As the object is moved relative to the surface, the locations of these distinct features relative to the photosensing element move. By measuring this movement, the processor is able to determine the velocity, direction of movement, and position of the object relative to the surface.

9 Claims, 6 Drawing Sheets

POSITION SENSING DEVICE HAVING A SINGLE PHOTOSENSING ELEMENT

FIELD OF THE INVENTION

The present invention relates to position sensing devices and, more particularly, to a scanning device comprising a position sensing device having a single photosensing element.

BACKGROUND OF THE INVENTION

Hand-held scanning devices are portable imaging devices that generate machine-readable image data (sometimes referred to herein simply as image data) representing an image of an object. Generating image data representative of an image of an object is sometimes referred to as "imaging" or "scanning" the object. Some scanning devices generate image data representing a narrow "scan line" portion of the object being imaged. During the imaging process, the scanning device is moved relative to the object being imaged. As the scanning device is moved relative to the object, the scanning device generates image data representing a plurality of sequential scan line portions of the image of the object. The image of the object is, accordingly, represented by the image data of the cumulation of sequential scan lines similar to the image of the object represented by a conventional video display.

The image of the scan line portion of the object is focused onto a linear array of photodetector elements (sometimes referred to herein simply as photodetectors). The photodetectors may, as an example, be mounted to a plurality of linearly arranged electronic segments such as contact image sensors as are known in the art. The photodetectors may also be etched into a single semiconductor as is common in a charge-coupled device. The individual photodetectors generate image data representing discrete portions of the image of the scan line portion of the object. The image data may, as an example, be voltages wherein a relatively high voltage represents a relatively high intensity of light received by a photodetector and a relatively low voltage represents a relatively low light intensity received by a photodetector.

The image data generated by the photodetectors is transmitted to a processor. One of the functions of the processor is to create a data base or similar electronic structure that indicates the positions of the scan lines relative to the positions on the object from where the scan lines were generated. Alternatively, the data base may indicate the locations of the scan lines relative to each other. The data stored in the data base and the image data are used by the processor to replicate the image of the object. As an example, in the situation where the scanning device is generating image data representing a two-dimensional object, such as text located on a sheet of paper, the hand-held scanning device may be moved in any direction on the paper. Accordingly, the scan line portions may be generated from virtually any location on the paper, which leads to the image data representing the image of the object consisting of a plurality of scan line portions that may be skewed over the surface of the paper. In order to accurately replicate the image of the object, the hand held scanning device uses the data stored in the data base to determine the proper placement of the scan line portions of the image of the paper. The processor may then create an electronic image of text printed on the paper by known processing techniques, e.g., stitching software.

Examples of hand-held scanning devices are described in the following United States patents and patent applications, which are all hereby incorporated by reference for all that is disclosed therein: U.S. Pat. No. 5,552,597 of McConica for HAND-HELD SCANNER HAVING ADJUSTABLE LIGHT PATH; U.S. Pat. No. 5,646,394 of Steinle for IMAGING DEVICE WITH BEAM STEERING CAPABILITY; U.S. Pat. No. 5,646,402 of Khovaylo et al. for EXPANDABLE HAND-HELD SCANNING DEVICE; U.S. Pat. No. 5,723,859 of Kerschner et al. for LINE CONTACT HAND-HELD SCANNING DEVICE AND METHOD HAVING A LIGHT PATH SUBSTANTIALLY PERPENDICULAR TO THE ORIENTATION OF THE OBJECT AT A LINE PORTION; Ser. No. 09/120,641 of Sims et al. for HAND HELD SCANNING DEVICE filed on Jul. 22, 1998, U.S. Pat. No. 6,043,503; and Ser. No. 09/120,637 of Sims et al. for HAND HELD SCANNING DEVICE filed on Jul. 22, 1998, abandoned.

A problem replicating the image of the object may be encountered if the velocity, position, or direction of movement of the scanning device relative to the object becomes unknown during the scanning process. For example, if the scanning device is imaging one thousand scan line portions of the image of the object per second and the scanning device is moving along a single axis at a constant rate of one inch per second relative to the object, each scan line represents one one-thousandth of an inch of the image of the object. If the correct velocity of the scanning device relative to the object has been conveyed to the processor, the processor will create a data base indicating that each scan line represents one one-thousandth of and inch of the image of the object. Alternatively, the processor will indicate that each scan line is located one one-thousandth of an inch from an adjacent scan line. Based on the image data and the data stored in the data base, the processor may accurately replicate the image of the object. If, however, the velocity of the scanning device relative to the object is decreased and the decreased velocity is not conveyed to the processor, the processor will continue to process the image data as though each scan line represents one one-thousandth of an inch of the object. Each scan line, however, will represent less than one one-thousandth of an inch of the object. Accordingly, the image of the object will be compressed. If, on the other hand, the velocity of the scanning device relative to the object is increased and the increased velocity is not conveyed to the processor, the image of the object will be expanded.

Accurately replicating an image of an object when either the velocity or position of the scanning device relative to the object becomes unknown is impossible. If the position or velocity is not known, the processor will not know where the scanning device is located relative to the object as the scan lines are being generated. Accordingly, the processor will not be able to properly place the scan line portions relative to each other so as to accurately replicate the image of the object. This problem is exacerbated in hand-held scanning devices where the scan lines may be generated from anywhere on the object and are often skewed over the surface of the object.

In order to overcome these problems, scanning devices use position sensors to detect the position of the scanning device relative to the object. The position sensors output position information pertaining to the position of the scanning device relative to the object as the scan line portions of the image of the object are being generated. This position information is conveyed to the processor where it is incorporated into the above-described data base.

Some scanning devices have an optical sensor affixed to the scanning device to determine the position of the scanning device relative to the object being scanned. The optical sensor periodically generates image data from a small two-dimensional area of the object being scanned. A processor receives this image data and identifies distinct features on the object. In the example where the object is text printed on a sheet of paper, the distinct features may be inherent irregularities in the surface of the paper. The positions of these distinct features relative to the optical sensor are stored in a memory device. As the scanning device is moved relative to the object, the positions of these distinct features move relative to the optical sensor. The processor compares the new positions of these distinct features to the positions stored in the memory device. Based on these comparisons, the processor is able to determine the position, direction of movement, and velocity of the scanning device to which the optical sensor is affixed relative to the object. Accordingly, the processor is able to create the above-described data base because the locations of the scan line portions of the image of the object relative to each other may be readily determined.

Some scanning devices have several of these two-dimensional optical sensors located at fixed positions relative to the linear array of photodetectors. For example, the scanning device may have two optical sensors spaced a distance from each other. The scanning device is able to compare the movement data from each optical sensor to determine the amount of rotational motion the scanning device has undergone. As the distance between the optical sensors increases, the accuracy to which the scanning device is able to determine rotational motion increases accordingly.

These optical sensors, however, tend to be some of the more expensive components comprising the scanning device. Accordingly, the use of multiple optical sensors substantially increases the cost of the scanning device. A minimum of two optical sensors, however, is required to be used in the scanning device in order to accurately determine rotational motion of the scanning device.

Therefore, a need exists for a hand-held scanning device that is able to accurately determine its position relative to an object, even as the scanning device rotates, without a substantially increasing of the cost of the scanning device.

SUMMARY OF THE INVENTION

A position sensing device having a single, two-dimensional photodetector device (sometimes referred to herein as a photosensing element) is disclosed herein. The positioning sensing device may comprise a single photodetector device, a first light path, a second light path, a first light source, and a second light source. The first light path and the second light path may extend from a first focal plane and a second focal plane respectively and they may intersect at the photodetector device. The first light source may serve to illuminate the first focal plane and the second light source may serve to illuminate the second focal plane. The photodetector device serves to convert light in either the first light path or the second light path to machine-readable image data.

The positioning sensing device may alternate illuminating the first focal plane and the second focal plane by controlling the period in which the first light source and the second light source are active. Specifically, the positioning sensing device may only illuminate either the first focal plane or the second focal plane. Accordingly, either an image of the first focal plane or the second focal plane will be received and, thus, converted to image data, by the photodetector device. This alternating between the first focal plane and the second focal plane permits a single photodetector to image two different portions of an object. A processor associated with the photodetector may analyze the image data to determine the movement of the positioning sensing device relative to the object in a conventional manner.

DETAILED DESCRIPTION OF THE INVENTION

FIGS. 1 through 6, in general, illustrate an optical position sensing device 100 comprising: a two-dimensional photosensor array 130; a first light path 260 extending between a first area 220 and said two-dimensional photosensor array 130; a second light path 270 extending between a second area 230 and said two-dimensional photosensor array 130; a first optical component 150 located in said first light path 260; a second optical component 152 located in said second light path 270; a first light source 140 associated with said first area 220; a third light path 250 extending between said first light source 140 and said first area 220; a second light source 142 associated with said second area 230; and a fourth light path 256 extending between said second light source 142 and said second area 230.

FIGS. 1 through 6 also, in general, illustrate a method of determining the position of an object 104 relative to a surface 208. The method comprises: providing a two-dimensional photosensor array 130 associated with the object 104; directing light from a first focal plane portion 220 of the surface 208 to the two-dimensional photosensor array 130 for a period; directing light from a second focal plane portion 230 of the surface 208 to the two-dimensional photosensor array 130 during a period when light is not being directed from the first focal plane portion 220 of the surface 208 to the two-dimensional photosensor array 130; generating image data with the two-dimensional photosensor array 130 representative of an image received by the two-dimensional photosensor array 130; causing relative movement between the surface 208 and the two-dimensional photosensor array 130; and performing an analysis of the image data to determine the displacement of the two-dimensional photosensor array 130 relative to the surface 208.

FIGS. 1 through 6 also, in general, illustrate a method of determining the position of an object 104 relative to a surface 208. The method comprises: providing a two-dimensional photosensor array 130 associated with the object 104; providing a first light source 140 associated with a first focal plane portion 220 of the surface 208; providing a second light source 142 associated with a second focal plane portion 230 of the surface 208; illuminating the first focal plane portion 220 of the surface 208 with the first light source 140 for first period; illuminating the second focal plane portion 230 of the surface 208 with the second light source 142 for a second period, wherein the second period comprises a time when the first light source 140 is not illuminating the first focal plane portion 220 of the surface 208; directing light from the first focal plane portion 220 of the surface 208 to the two-dimensional photosensor array 130 during the first period; directing light from the second focal plane portion 230 of the surface 208 to the two-dimensional photosensor array 130 during the second period; generating image data with the two-dimensional photosensor array 130 representative of an image received by the two-dimensional photosensor array 130; causing relative movement between the surface 208 and the two-dimensional photosensor array 130; and performing an analysis on the image data to determine the displacement of the two-dimensional photosensor array 130 relative to the surface 208.

FIGS. 1 through 6 also, in general, illustrate a device 100 for determining the position of an object 104 relative to a surface 208. The device 100 comprises: a two-dimensional photosensor array 130 for generating image data, wherein the two-dimensional photosensor array 130 is associated with the object 104; means 140 for illuminating a first area portion 220 of the surface 208 for a first period; means 142 for illuminating a second area portion 230 of the surface 208 for a second period, wherein the second period comprises a time when the first area portion 220 is not being illuminated; means 150 for directing light from the first area portion 220 of the surface 208 to the two-dimensional photosensor array 130; means 152 for directing light from the second area portion 230 of the surface 208 to the two-dimensional photosensor array 130; and means 300 for analyzing image data generated by the two-dimensional photosensor array 130 to determine the displacement of the two-dimensional photosensor array 130 relative to the surface 208.

Figure 1:
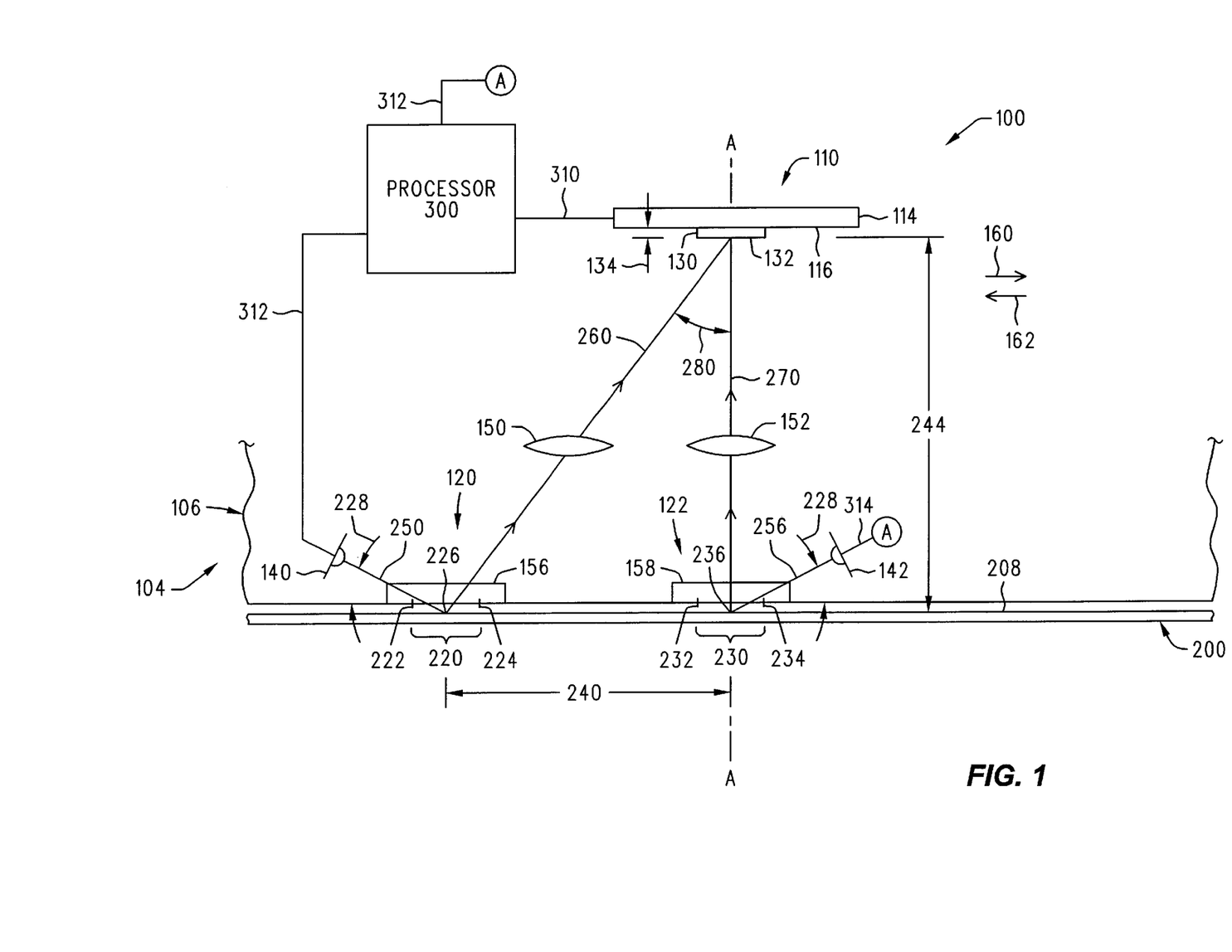
FIG. 1 is a side view of a position sensing device incorporated into a scanning device.

Referring to FIG. 1, a position sensing device 100 is described herein that may be used to determine the position of an object to which the position sensing device 100 is attached relative to a surface. Specifically, the position sensing device 100 determines its position relative to the surface, which in turn, is used to yield the position of the object to which the position sensing device 100 is attached relative to the surface. In the example illustrated herein, the position sensing device 100 is used to determine the position of a scanning device 104 relative to a surface 208 of an object 200, e.g., a sheet of paper. It is to be understood, however, that the position sensing device 100 may be used in conjunction with devices other than scanning devices and sheets of paper.

The scanning device 104 may, for example, be configured as a conventional hand-held scanning device, such as the hand-held scanning devices described in the United States patents and patent applications: U.S. Pat. No. 5,552,597 of McConica; U.S. Pat. No. 5,646,394 of Steinle; U.S. Pat. No. 5,680,375 of Cristie et al.; U.S. Pat. No. 5,723,859 of Kerschner et al.; Ser. No. 09/120,641 of Sims et al.; and Ser. No. 09/120,637 of Sims et al.; which have all been previously referenced.

In summary, the position sensing device 100 determines the position of the scanning device 104 by imaging a left area portion 220 and a right area portion 230 of the surface 208 wherein the left area portion 220 and the right area portion 230 are two-dimensional portions of the object 200. The left area portion 220 is sometimes referred to herein simply as the left area 220 and the right area portion 230 is sometimes referred to herein simply as the right area 230. It should be noted that FIG. 1 is a cross sectional view of the object 200, accordingly, the left area 220 and the right area 230 are illustrated as one-dimensional linear segments rather than two-dimensional planar portions. The position sensing device 100 identifies the locations of distinct features in the images of the left area 220 and the right area 230. For example, in the situation where the object 200 is a sheet of paper, the position sensing device 100 may identify unique features of the object surface 208 caused by pulp material in the paper.

During the scanning process, the scanning device 104 is moved relative to the object surface 208, which causes the left area 220 and the right area 230 to move relative to the position sensing device 100. Accordingly, the distinct features in the left area 220 and the right area 230 move relative to the position sensing device 100 by an amount and in a direction that is proportional to the movement of the scanning device 104. The position sensing device 100 measures the amount and direction of the movement of the distinct features relative to the left area 220 and the right area 230 to determine the velocity, position, and direction of movement of the scanning device 104 relative to the surface 208.

The two areas 220 and 230 are imaged in order to accurately determine the rotational motion of the scanning device 104. Specifically, the difference in direction and movement between the left area 220 and the right area 230 relative to the object surface 208 is readily analyzed to yield the rotational motion of the scanning device 104. For example, if the scanning device 104 rotates about an axis defined by the reference line AA, imaging the two areas, 220 and 230, allows an accurate determination of the rotational movement of the scanning device 104. It should be noted that a greater distance 240 between the left area 220 and the right area 230 will yield greater precision in determining the rotational movement of the scanning device 104. This is due to a slight rotational motion of the scanning device 104 causing a greater difference in the direction and motion between the left area 220 and the right area 230 relative to the object surface 208.

Conventional position sensing devices image two separate areas by using two individual two-dimensional photosensor devices, which are relatively expensive components. The use of two individual photosensor devices substantially increases the cost of the conventional position sensing device and, thus, a conventional scanning device using the positioning sensing device.

The position sensing device 100 disclosed herein overcomes the problems associated with the use of multiple photosensor devices by using a single photosensor device 130. Two light paths 260 and 270 direct images of the left area 220 and the right area 230 to the single photosensor device 130. The position sensing device 100 selectively images either the left area 220 or the right area 230 with the single photosensor device 130. The image data generated by the photosensor device 130 representative of images of the left area 220 and the right area 230 is processed in a conventional manner to determine the position, velocity, and direction of movement of the position sensing device 100. The position sensing device 100 disclosed herein alleviates the need for multiple photosensor devices and, thus, reduces the cost of the scanning device 104.

Having summarily described the position sensing device 100 and the scanning device 104, they will now be described in greater detail.

The position sensing device 100 may be located within a housing 106 of the scanning device 104, wherein the scanning device is of the type that generates machine-readable image data representative of an image of an object 200. The scanning device 104 will be described below determining its position relative to a surface 208 of the object 200 wherein the object 200 is a sheet of paper and the surface 208 is a surface of the sheet of paper. It is to be understood that the position sensing device 100 may be incorporated into devices other than scanning devices and that the scanning device 104 may be used in conjunction with objects other than sheets of paper.

The position sensing device 100 may have a photodetector assembly 110, a first light source 140, and a second light source 142. In addition, the position sensing device 100 may have several light paths including a first incident light path 250, a first reflection light path 260, a first incident light path 256, and a second reflection light path 270. The position sensing device 100 may also include a first lens 150 and a second lens 152. The first lens 150 may be located in the first reflection light path 260 and may serve to focus light in the first reflection light path 260 onto the photodetector assembly 110. Likewise, the second lens 152 may be located in the second reflection light path 270 and may serve to focus light in the second reflection light path 270 onto the photodetector assembly 110. As will be described below, the first lens 150 and the second lens 152 may also serve to direct light in the first reflection light path 260 and the second reflection light path 270 to the photodetector assembly 110.

The first light source 140 and second light source 142 may, as an example, be light-emitting diodes as are known in the art. They each may emit light in a beam large enough to illuminate an area portion of an object. In the example illustrated herein, the first light source 140 may emit a light beam large enough to illuminate a left area portion 220 of an object 200 as will be described in greater detail below. The left area 220 may include an area extending between a left edge 222 and a right edge 224. Likewise, the second light source 142 may emit a beam of light large enough to illuminate a right area portion 230 of the object 200. The right area 230 may include an area extending between a left edge 232 and a right edge 234. In some embodiments of the position sensing device 100, the first light source 140 and the second light source 142 may emit different frequencies of light.

The photodetector assembly 110 may comprise a photosensor device 130 and a substrate 114. The substrate 114 may be a printed circuit board as is known in the art that is attached to the housing 106 of the scanning device 104 in a conventional manner. The substrate 114 may have a plurality of lands (not shown) that conduct electricity between components mounted to the substrate 114, including the photosensor device 130. The substrate 114 may also have a substrate surface 116 that may serve as a mounting surface for the components that are mounted to the substrate 114. The photosensor device 130 may be mounted to the substrate surface 116 of the substrate 114 in a conventional manner, i.e., by soldering or by a socket. The photosensor device 130 may extend a height 134 from the substrate surface 116.

The photosensor device 130 may have a photodetector surface 132 with a two-dimensional array of photodetector elements (sometimes referred to simply as photodetectors and not shown in FIG. 1) attached thereto. Each photodetector may output machine-readable image data (sometimes referred to herein simply as image data) representative of light received by the photodetectors. For example, a photodetector that receives a relatively high intensity of light may output a relatively high data value, e.g., a high voltage. Likewise, a photodetector that receives a relatively low intensity of light may output a relatively low data value, e.g., a low voltage. The photosensor device 130 may have enough resolution to image minute details of the object 200, such as contours on the surface of a sheet of paper.

A processor 300 may be electrically connected to the substrate 114 by a data line 310. By virtue of the lands in the substrate 114, the processor 300 may be ultimately electrically connected to the photosensor device 130. The processor 300 may also be connected to the first light source 140 by a data line 312 and to the second light source 142 by a data line 312. As will be described in greater detail below, the processor 300 may serve to process image data generated by the photosensor device 130 and to control the first light source 140 and the second light source 142.

The image data generated by the photodetectors may be output from the photosensor device 130 to the processor 300. The image data may pass from the photosensor device 130 to the lands on the substrate 114. The image data may then be transmitted from the substrate 114 via the data line 310 to the processor 300. The processor 300 may be a conventional processor that is adapted to analyze image data as detailed below. The processor 300 may be further adapted to activate the first light source 140 and the second light source 142 via the data line 310 and the data line 312 respectively.

As was briefly described above, the position sensing device 100 is illustrated in FIG. 1 as determining its position relative to the surface 208 of the object 200. The object 200 is illustrated herein as being a sheet of paper and the surface 208 is illustrated herein as being a surface on the sheet of paper. The position sensing device 100 is illustrated as being attached to the scanning device 104. Accordingly, the position sensing device 100 determines the position of the scanning device 104 relative to the object surface 208.

The scanning device 104 may have a housing 106 wherein the position sensing device 100 may be located within the housing 106. The housing 106 may have a first aperture 120 and a second aperture 122 formed therein. A first window 156 may be located in the first aperture 120 and a second window 158 may be located in the second aperture 122. The first window 156 and second window 158 may be transparent components and may serve to pass light in the light paths between the interior and exterior of the housing 106.

Having described the components of the position sensing device 100 and the scanning device 104, a description of the operation of the position sensing device 100 will now follow. The description of the operation of the position sensing device 100 is further illustrated in the flow chart of FIG. 2.

Figure 3:
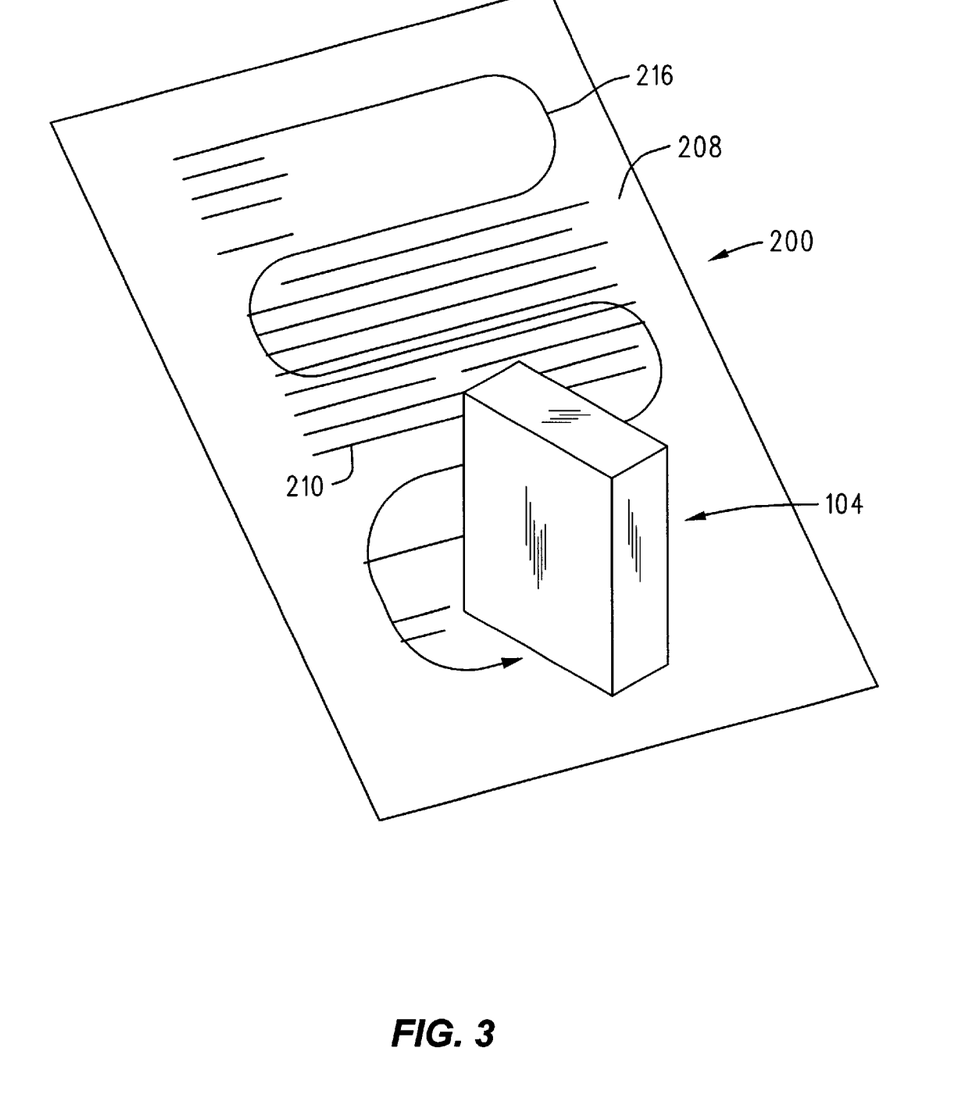
FIG. 3 is an illustration of the scanning device of FIG. 1 following a meandering path on a sheet of paper.

FIG. 3 illustrates the scanning device 104 being moved relative to the object 200 wherein the object 200 is a sheet of paper. The position sensing device 100 of FIG. 1 will be described below determining the position of the scanning device 104 relative to the object surface 208 which, as illustrated in FIG. 3, is the surface of the sheet of paper. The scanning device 104 may, as an example, follow a meandering path 216 on the paper to image text 210 printed on the surface 208. The scanning device 104 will be described herein as being a hand-held type of scanning device.

Referring again to FIG. 1, in summary, the position sensing device 100 alternates between imaging the left area 220 and the right area 230 of the object surface 208 with the photosensor device 130. The locations of distinct features in the left area 220 and the right area 230, relative to the photosensor device 130 are recorded by the processor 300. As the scanning device 104 is moved relative to the object surface 208, the locations of these distinct features move relative to the photosensor device 130. By determining the direction and rate of movement of these distinct features relative to the photosensor device 130, the position sensing device 100 is able to determine the direction and rate of movement of the scanning device 104 relative to the object surface 208. The position sensing device 100 analyzes the direction and rate of movement of the scanning device 104 to determine the position of the scanning device 104 relative to the object surface 208. By using the single photosensor device 130 to image both the left area 220 and the right area 230, the position sensing device 100 is able to function with the single photosensor device 130.

Having summarily described the operation of the position sensing device 100 and the scanning device 104, the operation of both will now be described in greater detail.

The processor 300 determines whether the left area 220 or the right area 230 of the object surface 208 is to be imaged. This is achieved by controlling whether the first light source 140 or the second light source 142 is activated. As will be described below, in this embodiment of the position sensing device 100, the first light source 140 and the second light source 142 cannot be activated simultaneously. The following description commences with the first light source 140 being activated followed by the second light source 142 being activated.

The processor 300 outputs an instruction to the first light source 140 via the data line 312 instructing the first light source 140 to activate. The processor 300 simultaneously sends an instruction to the second light source 142 via the data line 314 instructing the second light source 142 to deactivate. When the first light source 140 is activated, it emits a beam of light along the first incident light path 250 that illuminates the left area 220. The first incident light path 250 is illustrated as extending between the first light source 140 and a center point 226 within the left area 220. Specifically, the first incident light path 250 may extend from the first light source 140, through the first window 156, through the first aperture 120 and to the left area 220. The light in the first incident light path 250 illuminates the left area 220 extending from a left edge 222 to a right edge 224. It should be noted that the left area 220 and the right area 230 are two-dimensional planar portions of the object surface 208, however, FIG. 1 is a side view of the object surface 208, thus, the left area 220 and the right area 230 appear as linear segment portions of the object surface 208.

A grazing angle 228 exists between the first incident light path 250 and the object surface 208. The first light source 140 is positioned relative to the object surface 208 to make the grazing angle 228 relatively small. This small grazing angle 228 reduces specular reflection that may result due to the illumination of the left area 220. The small grazing angle 228 further serves to enhance the optical contrast of distinct features on the object surface 208, which increases the probability that these distinct features will be detected by the position sensing device 100. For example, if the distinct feature is a pit in the object surface 208, the small grazing angle 228 will reduce the probability that the pit will be illuminated. Thus, the pit will appear as a dark spot surrounded by a bright illuminated area, which can be relatively easily detected by the position sensing device 100. Likewise, if the distinct feature is a rise in the object surface 208, the rise will be illuminated and a shadow will be cast behind the rise. The position sensing device 100 will likely be able to detect the contrast between the shadow and the bright illumination of the rise. The second incident light path 256 may also form a relatively small grazing angle (not shown) with the object surface 208.

Light reflected from the left area 220 follows the first reflection light path 260 from the left area 220, through the first aperture 120, through the first window 156, through the first lens 150, and to the photosensor device 130. An image of the left area 220 is present in this light. The first lens 150 serves to direct the first reflection light path 260 to the photosensor device 130, thus, focusing an image of the left area 220 onto the photosensor device 130. As illustrated in FIG. 1, the first reflection light path 260 intersects the photosensor device 130 at an angle 280 relative to the reference line AA, where the reference line AA is perpendicular to the photodetector surface 132. Accordingly, the first lens 150 is appropriately placed within the scanning device 104 to assure that the first reflection light path 260 intersects the photosensor device 130 at the angle 280. For example, the focal axis of the first lens 150 may be offset from the first reflection light path 260, which may be used to direct the first reflection light path 260 to the photosensor device 130. An example of offsetting the focal axis of a lens from a light path in order to direct the light path to a target is disclosed in U.S. patent application Ser. No. 09/290,842 of Gardner for OPTICAL ASSEMBLY HAVING LENS OFFSET FROM OPTICAL AXIS, filed on Apr. 13, 1999, which is hereby incorporated by reference for all that is disclosed therein.

The photosensor device 130 converts the image of the left area 220 to image data. Specifically, the photosensor device 130 converts light in first reflection light path 260, which is an image of the left area 220, to image data. The image data is output from the photosensor device 130 to lands on the substrate 114 where it is transmitted to the processor 300 via the data line 310. The image data may be in the form of analog voltages wherein each voltage represents the intensity of light in a portion of the left area 220. Alternatively, the image data may be in the form of digital values wherein each digital value represents the intensity of light in a portion of the left area 220. During the period that the first light source 140 is active, the processor 300 is in a mode to receive image data from the photosensor device 130. Upon receipt of the image data, the processor 300 electronically tags the image data as being representative of the left area 220.

After the processor 300 has received image data representative of the image of the left area 220, the processor 300 transmits an instruction via the data line 312 instructing the first light source 140 to deactivate. The deactivation of the first light source 140 ceases the image of the left area 220 being directed to the photosensor device 130. During this period, the processor 300 enters a mode that does not permit it to receive image data from the photosensor device 130. This alleviates the possibility that the processor 300 receives image data from the photosensor device 130 that is the result of extraneous light entering the scanning device 104.

The position sensing device 100 then images the right area 230 in a similar manner as the left area 220 was imaged. The processor 300 sends an instruction via the data line 314 to the second light source 142 instructing the second light source 142 to activate. The processor 300 simultaneously enters a mode that again enables it to receive image data from the photosensor device 130. The second light source 142 emits a beam of light along the second incident light path 256 that illuminates the right area 230. Specifically, the second incident light path 256 extends from the second light source 142, through the second window 158, through the second aperture 122 and to a center point 236 in the right area 230 of the object surface 208. The light following the second incident light path 256 illuminates an area extending at least the distance between a left edge 232 and a right edge 234 of the right area 230.

Light reflects from the right area 230 along the second reflection light path 270 to the photosensor device 130. Specifically, the light originates at the right area 230, passes through the second aperture 122, through the second window 158, through the second lens 152, and to the photosensor device 130. As illustrated in FIG. 1, the second reflection light path 270 is normal to both the photosensor device 130 and the right area 230. This normal intersection of the second reflection light path 270 generally provides a more precise image of the right area 230 focused onto the photosensor device 130 than with the second reflection light path 270 intersecting the right area 230 and the photosensor device 130 at an angle. The field effect aberrations are substantially reduced with the normal intersections described above. The second lens 152 serves direct light to intersect the photosensor device 130. Accordingly, the second lens 152 is properly positioned in the scanning device 104 so as to focus the light following the second reflection light path 270 onto the photosensor device 130.

The photosensor device 130 converts the light following the second reflection light path 270 to image data. Thus, the photosensor device 130 generates image data representative of the image of the right area 230 as was described above with reference to imaging the left area 220. The photodetector assembly 110 outputs image data to the processor 300 in the same manner as described above. Accordingly, the processor 300 receives image data from the 130 in a similar manner as described with reference to the left area 220.

After the processor 300 has received image data from the photosensor device 130 representing an image of the right area 230, the processor 300 transmits an instruction via the data line 314 instructing the second light source 142 to deactivate. The processor 300 simultaneously enters a mode wherein it will not receive image data from the photosensor device 130.

The processor 300 alternates between receiving image data from the left area 220 and the right area 230 by repeating the processes described above. As image data is received by the processor 300, the processor 300 tags the image data as representing the left area 220 or the right area 230 for processing as described below.

Figure 2:
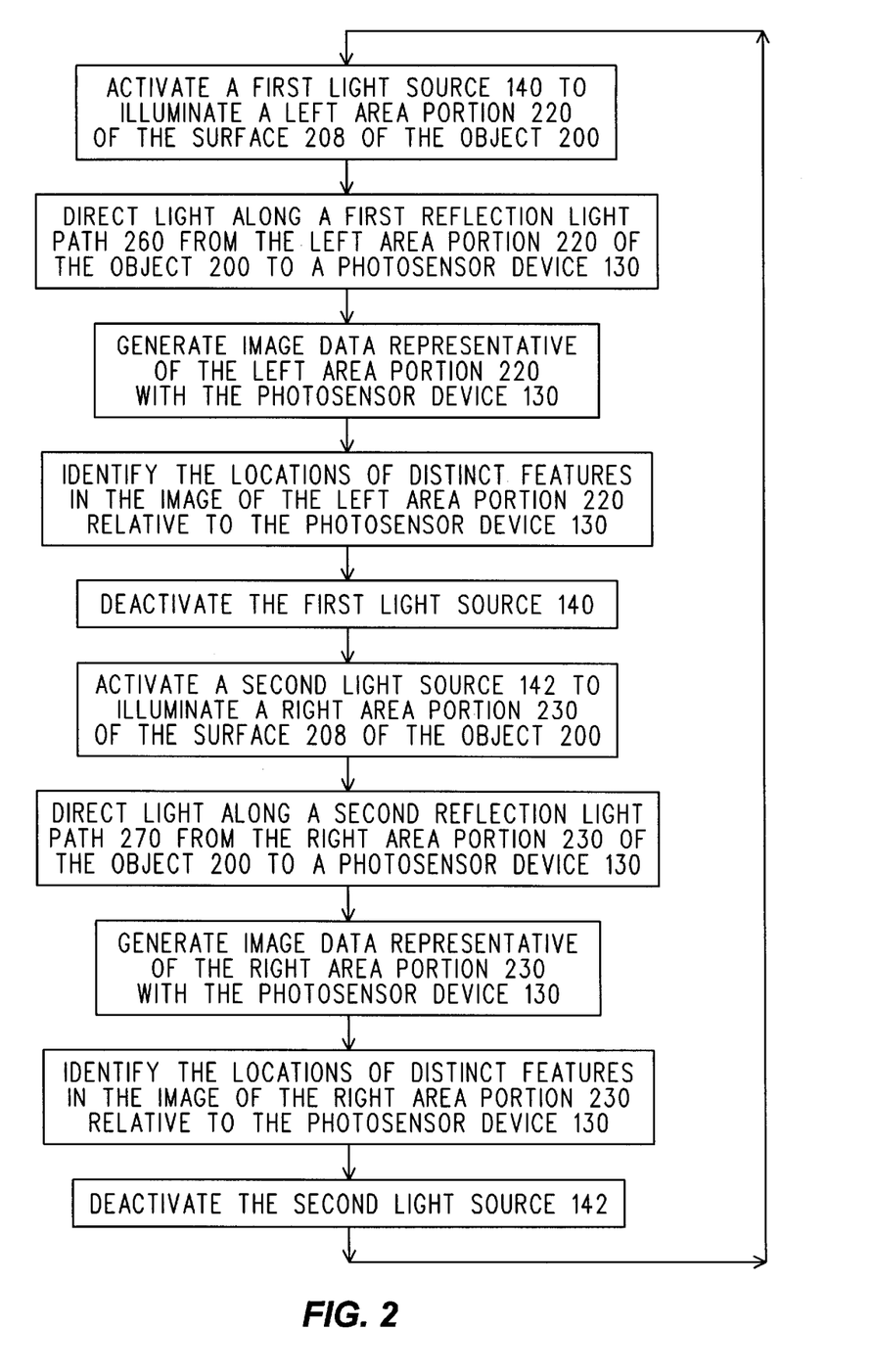
FIG. 2 is a flow chart illustrating the operation of the position sensing device illustrated in FIG. 1.

The processor 300 determines the locations of the distinct features in the left area 220 and the right area 230 relative to the photosensor device 130. As the scanning device 104 is moved, the locations of these distinct features relative to the photosensor device 130 will move accordingly. The processor 300 measures the amount and direction of movement of these distinct features relative to the photosensor device 130 to determine the velocity and direction of movement of the scanning device 104 relative to the object surface 208. The processor 300 is then able to calculate the position of the scanning device 104 relative to the object surface 208. The processor 300 is further able to calculate the position of the scanning device 104 as it is rotated about the reference line AA or moved along the meandering path 216 as illustrated in FIG. 2. It should be noted that the processor 300 is able to determine the position of the scanning device 104 as it is rotated about an axis defined by the reference line AA or other axes parallel to the reference line AA. Examples of using image data from two-dimensional photosensor arrays to determine the position of a scanning device are disclosed in the following United States patents: U.S. Pat. No. 5,644,139 of Allen et al. for NAVIGATION TECHNIQUE FOR DETECTING MOVEMENT OF NAVIGATION SENSORS RELATIVE TO AN OBJECT; and U.S. Pat. No. 5,578,813 of Allen et al. for FREEHAND IMAGE SCANNING DEVICE WHICH COMPENSATES FOR NON-LINEAR MOVEMENT, which are both hereby incorporated by reference for all that is disclosed therein.

The position sensing device 100 described herein has advantages over conventional position sensing devices. For example, only one photosensor device 130 is required with the position sensing device 100. As described above, the photosensor device 130 tends to be one of the more costly components of the scanning device 104, therefore, reducing the number of photosensor devices 130 required by the position sensing device 100 significantly reduces the cost of the scanning device 104. In addition, it follows that the position sensing device 100 only needs electronics to support one photosensor device, rather than two photosensor devices as with conventional position sensing devices.

Having described an embodiment of the position sensing device 100, other embodiments of the position sensing device 100 will now be described. For example, FIG. 4 illustrates an embodiment of the position sensing device 100 using reflective devices 290 and 292 to direct light from the object surface 208 to the photosensor device 130.

Figure 4:
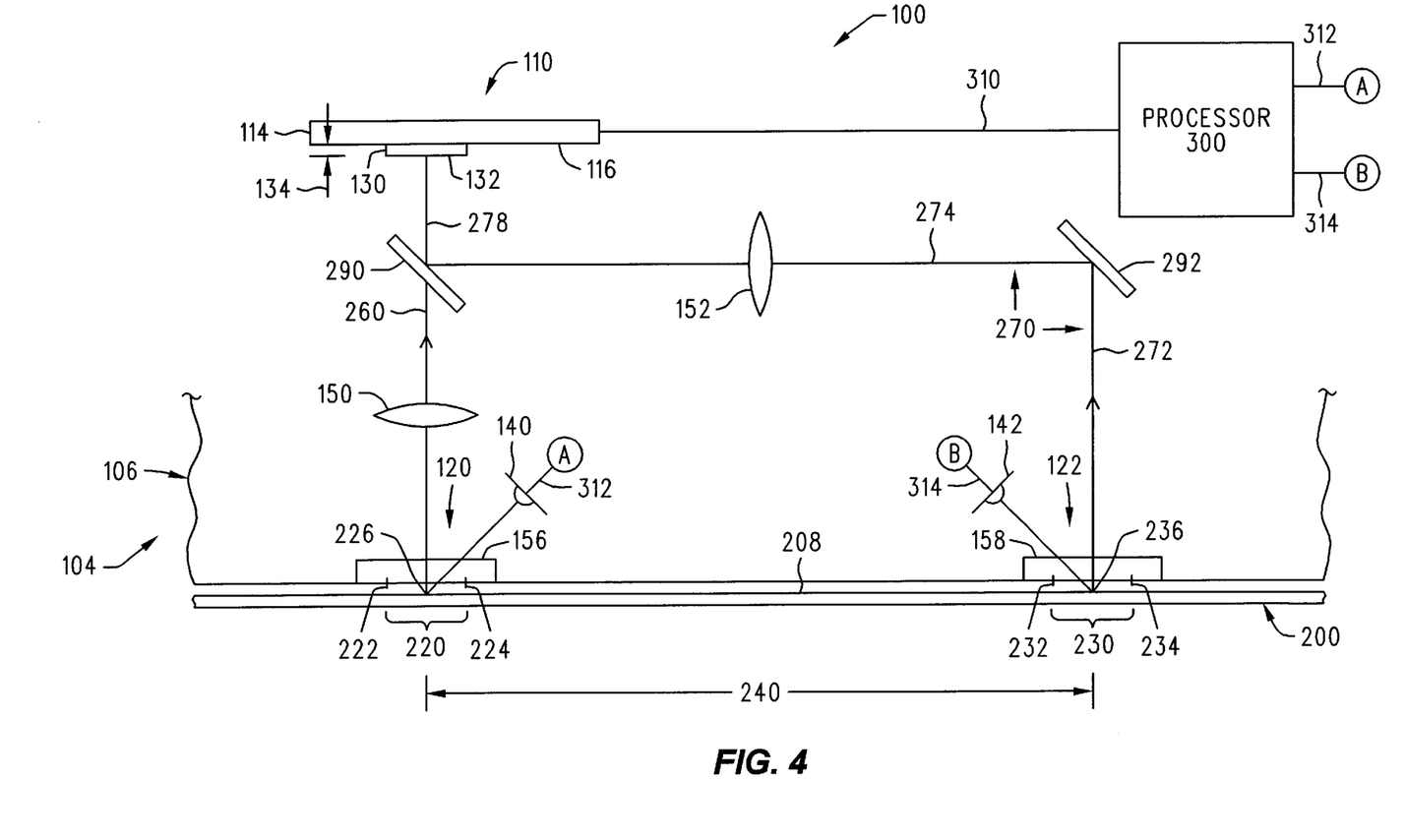
FIG. 4 is a side view of an embodiment of the position sensing device of FIG. 1.

The position sensing device 100 of FIG. 4 may have a first reflective device 290 located at the intersection of the first reflection light path 260 and the second reflection light path 270. The position sensing device 100 may also have a second reflective device 292 that may serve to direct the second reflection light path 270 toward the first reflective device 290. The first reflective device 290 may, as an example, be a beam splitter and the second reflective device 292 may, as an example, be a mirror.

The first light source 140 and the second light source 142 may function in substantially similar manners as described with regard to FIG. 1. The first light source 140 and the second light source 142, however, may emit light having different frequencies. For example, the first light source 140 may emit light having frequency one and the second light source 142 may emit light having frequency two. The first reflective device 290 may be adapted to pass light having frequency one and to reflect light having frequency two.

The first reflection light path 260 and the second reflection light path 270 in the position sensing device 100 of FIG. 4 are both normal to the object surface 208. This leaves room for the first light source 140 and the second light source 142 to be located between the first reflection light path 260 and the second reflection light path 270, which makes the scanning device 104 more compact and, thus, more portable.

Having described the components of the position sensing device 100 of FIG. 4, the operation of the position sensing device 100 of FIG. 4 will now be described.

The position sensing device 100 of FIG. 4 illuminates the left area 220 in the manner described with reference to FIG. 1 by having the processor 300 activate the first light source 140. Accordingly, the left area 220 is illuminated with light having frequency one. The first reflection light path 260 extends from the left area 220, through the first aperture 120, through the first window 156, through the first lens 150, through the first reflective device 290, and to the photosensor device 130. As described above, the first reflective device 290 passes light having frequency one, thus, light in the first reflection light path 260 passes through the first reflective device 290. The portion of the first reflection light path 260 extending between the first reflective device 290 and the photosensor device 130 is referred to herein as the common light path 278. The common light path 278 is common to the first reflection light path 260 and the second reflection light path 270.

When the first reflection light path 260 via the common light path 278 intersects the photosensor device 130, the photosensor device 130 generates image data representative of the image of the left area 220 as described above. Likewise, the processor 300 receives and processes the image data in the manner described above.

After the processor 300 has received the image data representative of the image of the left area 220, the processor 300 deactivates the first light source 140 and activates the second light source 142 as described above. Accordingly, the second light source 142 illuminates the right area 230 with light having frequency two. Light having frequency two then reflects from the right area 230 along the second reflection light path 270. The second reflection light path 270 is divided into two sections denoted as a first section 272 and a second section 274. The first section 272 reflects from the right area 230, passes through the second aperture 122, through the second window 158 and to the second reflective device 292. As described above, the second reflective device 292 is a mirror. Accordingly, the second section 274 of the second reflection light path 270 reflects from the second reflective device 292 passes through the second lens 152 and intersects the first reflective device 290. As described above, the first reflective device 290 is a beam splitter adapted to reflect frequency two. Accordingly, the light reflects from first reflective device 290 along the common light path 278 to intersect the photosensor device 130.

The photosensor device 130 converts the image of the right area 230 to image data and transmits the image data to the processor 300 as described above. The process of illuminating the left area 220 and the right area 230 is repeated as the scanning device 104 is moved relative to the object surface 208. The processor 300 is able to determine the velocity and direction of movement of the scanning device 104 as described above with regard to the embodiment of the position sensing device 100 illustrated in FIG. 1.

In one embodiment of the position sensing device 100 illustrated in FIG. 4, the first reflective device 290 may be a partial reflecting mirror and the second reflective device 292 may be a conventional mirror. The first reflective device 290 may, as an example, reflect 50 percent of the light intersecting it. Thus, 50 percent of the light in the light path 274 will reflect from the first reflective device 290. Likewise 50 percent of the light in the first reflection light path 260 will pass through the first reflective device 290. This embodiment of the position sensing device 100 allows both the first light source 140 and the second light source 142 to emit the same frequency of light. The first light source 140 and the second light source 142, however, have to emit more intense light because the first reflective device 290 attenuates the light.

The embodiment of the position sensing device 100 illustrated in FIG. 4 does not require the first reflection light path 260 and the second reflection light path 270 to intersect the left area 220 and the right area 230 at an angle. Rather, the first reflection light path 260 and the second reflection light path 270 are normal to the left area 220 and the right area 230 respectively. In addition, the first reflection light path 260 and the second reflection light path 270 via the common light path 278 are normal to the photosensor device 130. Less distortion is encountered during imaging with the above-described normal intersections, which allows for more precise position sensing. The embodiment of the position sensing device 100 has the further advantage of maintaining relatively precise images of the left area 220 and the right area 230 as the position sensing device 100 is tilted during the scanning process.

Figure 5:
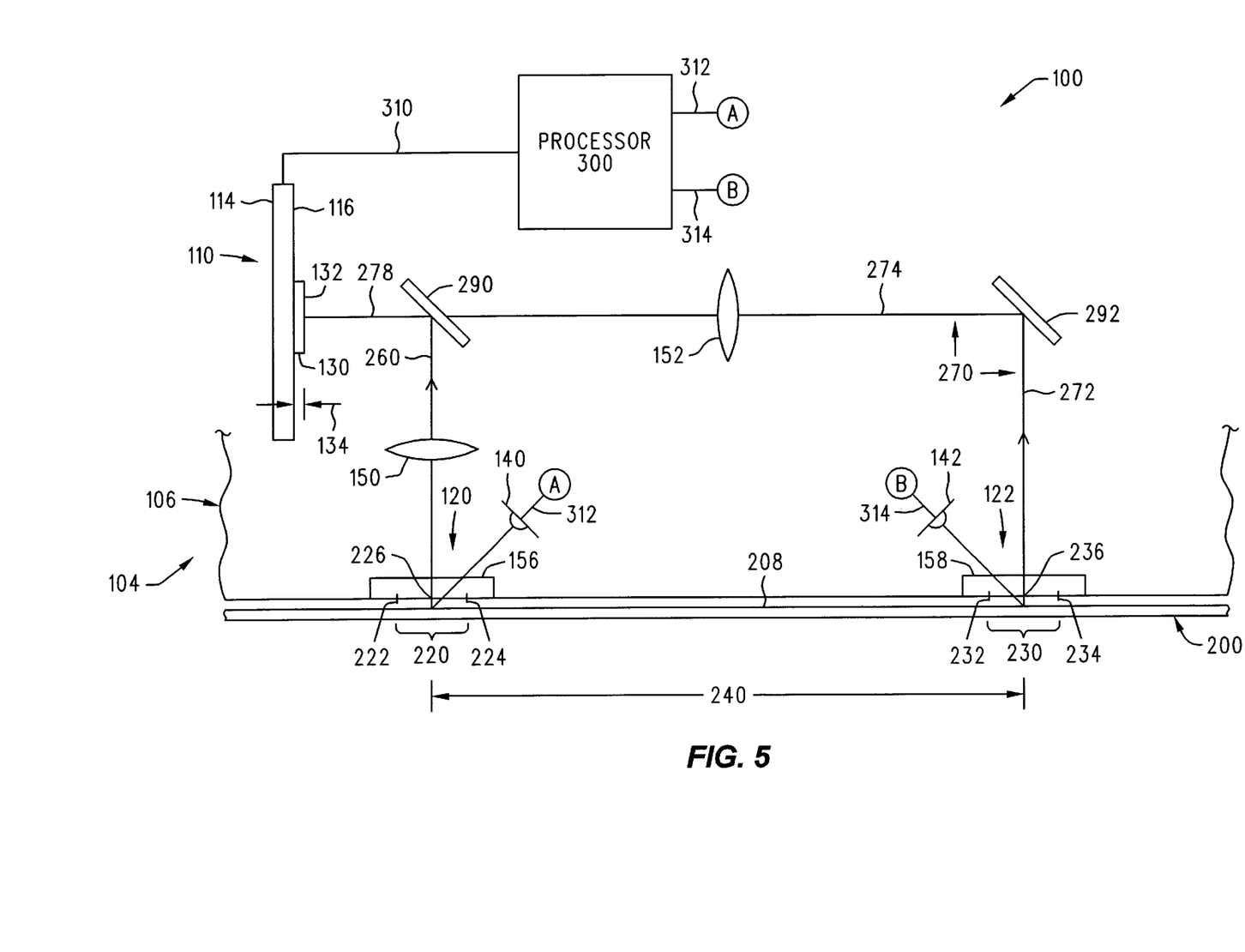
FIG. 5 is a side view of a further embodiment of the position sensing device of FIG. 1.

The embodiment of the position sensing device 100 illustrated in FIGS. 1 and 4 has the photosensor device 130 positioned parallel to the object surface 208. This parallel positioning of the photosensor device 130 relative to the object surface 208 may be preferable in situations where the position sensing device 100 is used in a relatively flat scanner. In some applications, however, it is preferable to position the photosensor device 130 perpendicular to the object surface 208 as illustrated in FIG. 5. For example, the perpendicular positioning of the photosensor device 130 relative to the object surface 208 may be preferable in situations where the position sensing device 100 is used in scanners that extend vertically from the objects being scanned.

A position sensing device 100 having the photosensor device 130 positioned perpendicular to the photosensor device 130 is illustrated in FIG. 5. The position sensing device 100 illustrated in FIG. 5 is substantially similar to the position sensing device 100 illustrated in FIG. 4. Unlike the position sensing device 100 illustrated in FIG. 4, the first reflective device 290 may pass light having frequency two and may reflect light having frequency one. In this situation, light in the first reflection light path 260 reflects from the first reflective device 290 toward the photosensor device 130. Likewise, light in the second reflection light path 270 passes through the first reflective device 290 to intersect the photosensor device 130.

Figure 6:
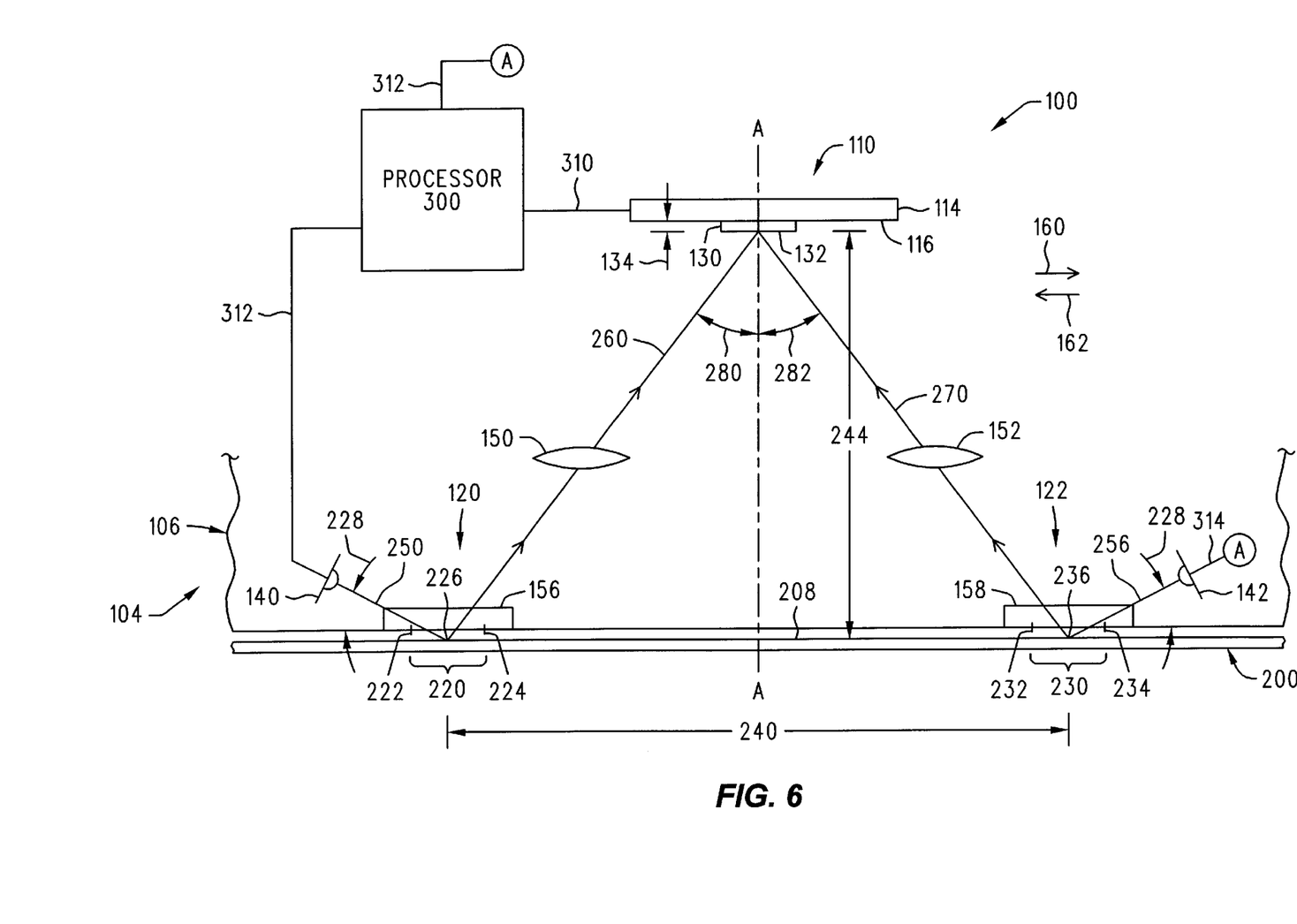
FIG. 6 is a side view of a further embodiment of the position sensing device of FIG. 1.

An embodiment of the position sensing device 100 similar to the embodiment illustrated in FIG. 1 is illustrated in FIG. 6. The second reflection light path 270 in the position sensing device 100 illustrated in FIG. 6 intersects the photosensor device 130 at an angle 282 relative to the reference line AA. The angle 282 allows the left area 220 and the right area 230 to be separated by a greater distance 240 than with the position sensing device 100 illustrated in FIG. 1. This has the advantage of providing more precise information as to the rotational motion of the position sensing device 100. The angle 282 may, however, cause the image of the right area 230 to be distorted relative to the image of the right area 230 of the position sensing device 100 illustrated in FIG. 1.

The position sensing device 100 has been described herein as imaging either the left area 220 or the right area 230 by controlling the activation of the first light source 140 and the second light source 142. Other embodiments may be used to alternate between imaging the left area 220 and the right area 230. For example, electronic shutter devices may be located in the light paths to control whether an image of the left area 220 or the right area 230 is received by the photosensor device 130. The shutter devices may be mechanically operated apertures or electronic apertures as are known in the art.

The position sensing device 100 has been described herein as imaging two area portions of the object surface 208. It is to be understood that this is for illustration purposes and that the position sensing device 100 may image a plurality of area portions of the object surface 208 by directing light from these area portions to the photosensor device 130 as illustrated herein.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical position sensing device comprising:

a two-dimensional photosensor array;

a first light path extending between a first area and said two-dimensional photosensor array;

a second light path extending between a second area and said two-dimensional photosensor array;

a first optical component located in said first light path;

a second optical component located in said second light path;

a first light source associated with said first area;

a third light path extending between said first light source and said first area;

a second light source associated with said second area; and a fourth light path extending between said second light source and said second area.

2. The device of claim 1 further comprising a partial reflection device, wherein:

said first light path and said second light path intersect at said partial reflection device;

said first light path passes through said partial reflection device; and said second light path reflects from said partial reflection device.

3. The device of claim 1 further comprising a beam splitting device wherein:

said first light path and said second light path intersect at said beam splitting device;

said first light path passes through said beam splitting device; and said second light path reflects from said beam splitting device.

4. The device of claim 1 wherein said first optical component and said second optical component are shutter devices.

5. The device of claim 1 wherein said first optical component is a lens.

6. The device of claim 1 wherein said optical position sensing device is operationally associated with a scanning device.

7. The device of claim 1 further comprising a processor operationally associated with said two-dimensional photosensor array, said first light source and said second light source.

8. The device of claim 1 wherein said first light path is normal to said two-dimensional photosensor array.

9. The device of claim 1 wherein said first light path is normal to said first area.

* * * * *